Nov. 30, 1954         A. C. HOFFMAN ET AL         2,695,679
                        OIL DEAERATION
Original Filed April 30, 1945                      3 Sheets-Sheet 1

Inventors
Allan C. Hoffman
Walter H. Geddes
James D. Olcott
by J. E. Beringer
Their Attorney

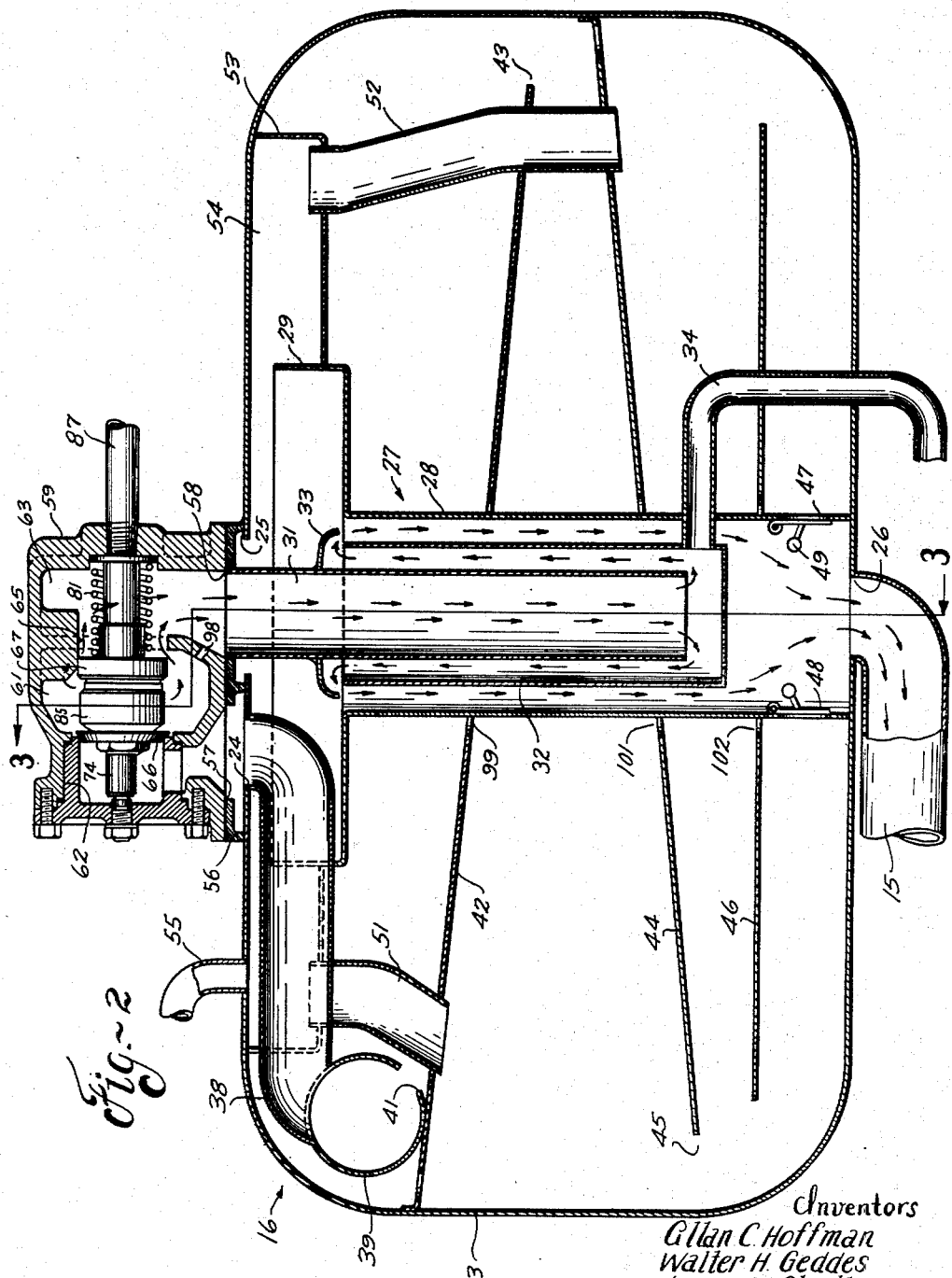

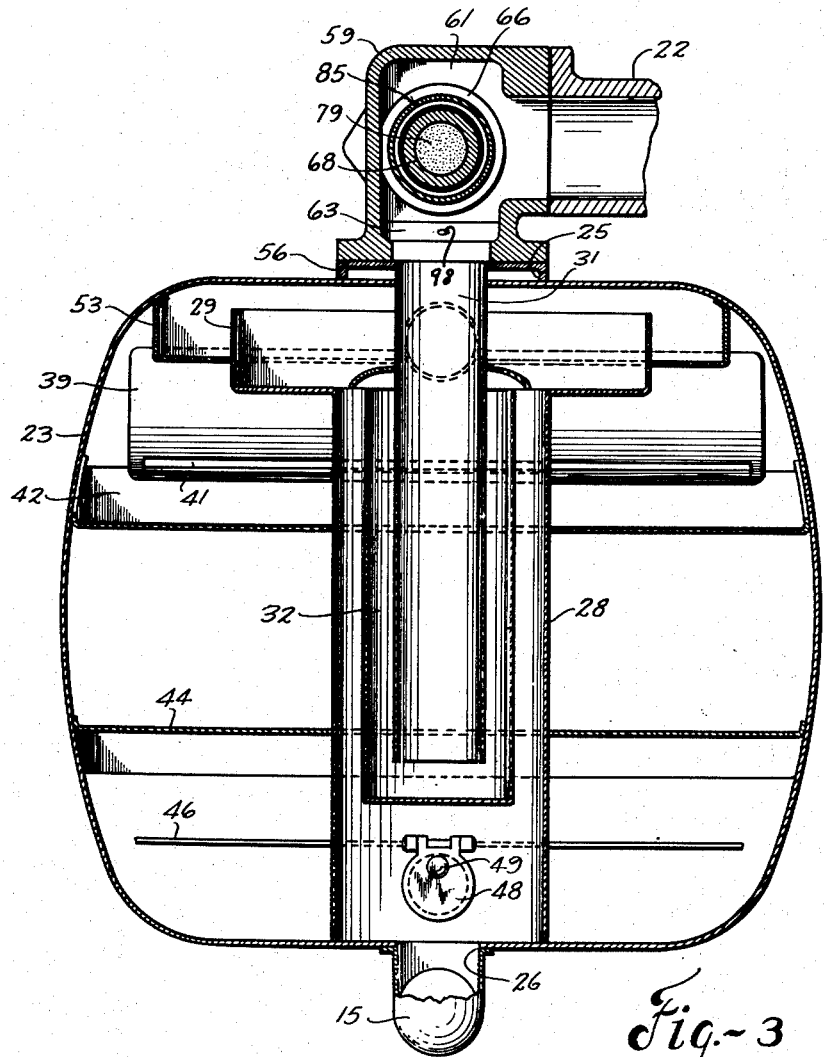

United States Patent Office

2,695,679
Patented Nov. 30, 1954

2,695,679

OIL DEAERATION

Allan C. Hoffman, Walter H. Geddes, and James D. Olcott, Dayton, Ohio, assignors to United Aircraft Products, Inc., Dayton, Ohio, a corporation of Ohio Original application April 30, 1945, Serial No. 591,182, now Patent No. 2,584,877, dated February 5, 1952. Divided and this application April 16, 1951, Serial No. 225,223

6 Claims. (Cl. 183—2.5)

This invention relates to apparatus for regulating the condition of oil supplied to an aircraft engine or the like for lubricating purposes. This is a division of application S. N. 591,182, filed April 30, 1945, now Patent 2,584,877, dated February 5, 1952.

In general, the object of the invention is to supply to the engine, oil which is conditioned for effective lubrication at all temperatures and at all altitudes of flight, and to remove from the oil discharged by the engine functional characteristics of an objectionable kind.

Aircraft design of recent effort has been directed to improvement of operation at high altitude and under conditions of low temperature. The need for major modification of the engine lubrication system has been particularly felt, and corrective measures have been applied in the form of oil temperature regulators, deaerators and diluting means. Oil temperature regulators having quick warm-up and anti-congealing characteristics are successfully employed but the problem of complete oil conditioning is not fully answered by limiting the maximum oil temperature to a predetermined value. Deaerators of the kind heretofore known add a new unit to the lubrication system and often are objectionable as causing an undesirably high pressure drop. The addition of a diluent to the oil, to lower its viscosity and thereby insure quick engine start under cold climatic conditions, has proved a process of merit but has in the past brought on certain deleterious effects such as violent boiling in the oil tank (resulting in spewing and loss of oil) and the supplying of a lubricant to the engine too low in viscosity for proper lubrication.

The present invention encompasses all known lubrication problems, and its approach toward modification of the lubrication system has begun at the source of oil supply, namely the oil tank. It is contemplated that the tank and associated parts shall function:

(a) To supply an adequate volume of oil to the engine, with substantially all the oil in the tank being effectively and quickly conditioned for flow.
(b) To deaerate the oil.
(c) To effect dilution of a portion of the oil in the system and to segregate the diluted oil from the non-diluted oil.
(d) To regulate the temperature of the oil at temperature values lower than the maximum set by the oil temperature regulator.
(e) To prevent the combined effects of dilution and rapid warm-up from decreasing the lubricant viscosity to an objectionably low level.

Other objects and structural details of the invention will appear from the following description, when read in connection with the acompanying drawings, wherein:

Fig. 2 is a view in longitudinal section, partly diagrammatic of the oil tank, including a thermostatically controlled flow sequence valve shown as it is positioned during warm-up of the engine or when the oil is cold;

Fig. 3 is a view of the oil tank in cross section, taken substantially along the line 3—3 of Fig. 2.

Figure 1:
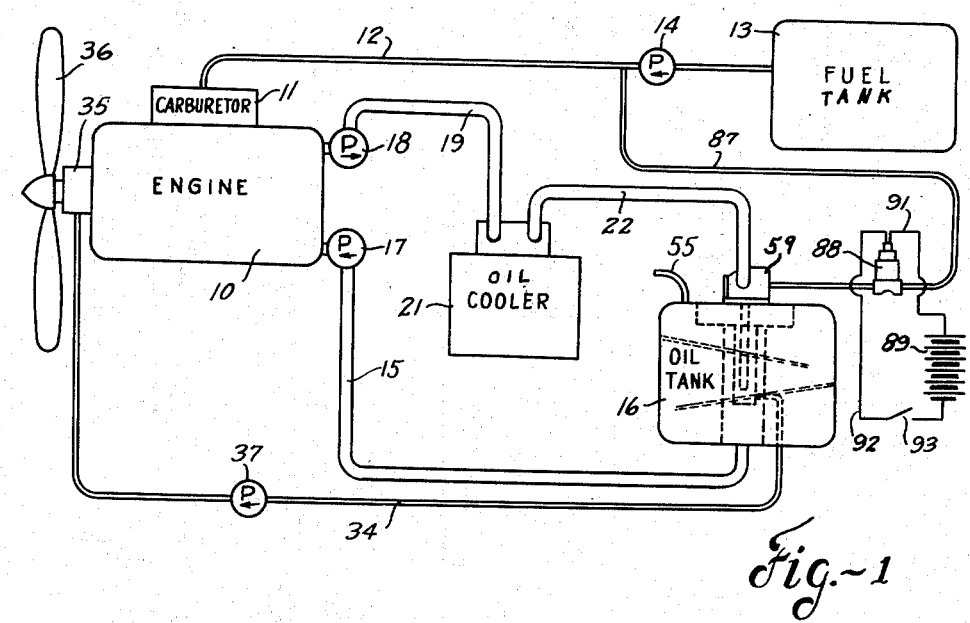
Fig. 1 is a diagram of an aircraft engine lubrication system and engine fuel system, in accordance with the present invention.

In the diagram comprising Fig. 1 an aircraft engine is indicated at 10 and its carburetor at 11, the carburetor being supplied with liquid fuel such as gasoline by a conduit 12 leading from a fuel tank 13. A pump 14 is disposed in the line 12 and causes the fuel to flow to the engine under pressure. Lubricating oil is directed to the engine by way of a conduit 15 connected at its opposite ends to the engine and to an oil tank 16. An engine driven pump 17 is arranged in the line 15 adjacent the engine 10 whereby oil may be drawn from the tank 16 and forced under pressure to the engine bearings and centers of lubrication. After passing through the engine the oil may collect in a sump or the like from which it is drained by another engine driven pump 18 and returned thereby to tank 16. The return oil conduit consists of a line 19 connecting the pump 18 to the inlet of an oil cooler 21, and a line 22 connecting the outlet of the oil cooler to the oil tank 16. During operation of the engine 10 the pumps 17 and 18 function continuously, the former to draw oil from the tank 16 and deliver it to the engine and the latter to take the oil from the engine and return it by way of the oil cooler 21 to the tank for re-use.

Referring to Figs. 2 and 3, the oil tank 16 comprises an outer shell 23 which may assume different shapes and sizes in accordance with the capacity of the system and with the location in the aircraft in which the tank is to be installed. The present illustration is in part diagrammatic, and shows the tank as a one-piece sheet metal container generally rectangular in form. The tank has alternative inlets 24 and 25 positioned adjacent one another on the upper side of the tank, and a single outlet 26 on the lower side of the tank. The engine supply conduit 15 is connected to the tank at the outlet 26. Vertically disposed within the tank shell 23 and extending between the inlet 25 and outlet 26 is an inner tank compartment or hopper 27. The hopper 27 comprises a generally cylindrical body portion 28 having one end resting on the lower side of the tank in a position surrounding outlet 26, and further comprises a flared upper end 29 constituting an overflow protection. Extending through the inlet 25 downward into the tubular portion 28 of hopper 27 is an inlet conduit 31. There further may be arranged within the tubular portion 28 of hopper 27, in a position surrounding conduit 31, a cylinder 32. The cylinder 32 is closed at its lower end and open at its upper end, whereby the oil from conduit 31 is directed first to the lower end of the cylinder and then compelled to flow upward along the outside of the conduit to the open end of the cylinder where it overflows into the hopper 27 and passes to the outlet 26. A curved baffle 33 is fastened to the conduit 31 immediately above the open end of cylinder 32 in order that displaced oil may be deflected downward in the hopper 27. The function of cylinder 32 is as a reservoir for supplying liquid to the propeller feathering mechanism. It will be observed that the lower end of the reservoir 32 opens into a conduit 34 which is passed through the hopper 27 and out of the tank shell 23. Referring again to the diagram of Fig. 1, it will be seen that conduit 34 leads to a hydraulic cylinder 35 constituting the means for feathering the propeller 36. The actual means for turning the propeller to a feathered position forms no part of this invention, and it will be sufficient to say that a selectively operable pump 37 is disposed in line 34, which pump when operated draws oil from reservoir 32 by way of conduit 34 and directs it under pressure to the cylinder 35 where feathering is accomplished in a known manner. It is, however, important and desirable that the oil in line 34 be maintained in a free-flowing condition. To this end, as will hereinafter appear, the feathering line is diluted as a part of the general dilution process.

Within the shell 23 of the oil tank 16 is a conduit 38 having one end registering with the tank inlet 24 and discharging at its other end into a manifold 39. As may be seen in Fig. 3, the manifold 39 is located near one end of the tank and adjacent the upper side thereof, and extends as a closed cylinder for approximately the full width of the tank. A longitudinally elongated slot or opening 41 is formed in the manifold 39 from which the oil flows in a wide shallow stream. Beneath the manifold 39 is a baffle 42 which touches and is secured to three sides of the shell 23 and has one end terminating a short distance from that end of the tank opposite the manifold 39. A passage 43 is defined between the free end of baffle 42 and the adjacent end of the tank. Beneath the baffle 42 is another baffle 44, similarly constructed but oppositely arranged to define a passage 45 around its end at that end of the tank opposite passage 43. While the baffles 42 and 44 are secured to the shell 23, they preferably are fostered by means not constituting a continuous seal, in order that air may not be trapped beneath the baffles. Beneath the baffle 44 is another baffle 46 which is secured to the hopper 27, with its ends terminating short of the walls of the shell. The several baffles 42, 44 and 46 have aligned openings therein to accommodate the tubular hopper 27. The baffles 42 and 43 incline downwardly within the tank, the angle of inclination being gradual so as to produce a relatively slow flow of the oil from the manifold 39 to the bottom of the tank. Thus the oil entering the tank by way of inlet 24 passes through conduit 38 to the manifold 39 from which it emerges as a wide flat stream onto the baffle 42 along which it flows toward the opposite end of the tank and through passage 43 onto the lower baffle 44. The oil stream continues along baffle 44 to the other end of the tank and through passage 45 to the bottom of the tank where it is compelled by baffle 46 to pass toward the outlet 26. The oil so flowing reaches outlet 26 through a series of radial ports 47 in the lower end of the tubular portion 28 of hopper 27. The ports 47 are controlled by flap valves 48 hinged to the interior of the hopper and carrying weights 49 which tend to hold the valves closed until a definite opposing pressure is applied.

The combination of the manifold 39 and inclined baffles 42 and 44 is designed to prevent uneven turbulent flow within the tank, and in so acting to produce an added feature of advantage, namely the release of entrained air from the oil. A well-known disability of aircraft engine lubrication systems, which conventionally are of the dry sump type, is that the high capacity scavenger pump, indicated at 18 in Fig. 1, operates at times to pump air into the system. The air mingles intimately with the oil, particularly under conditions of high temperature, and impairs lubrication. As a deaerating provision the tank has, in addition to the baffles 42 and 44, foam vents 51 and 52 extending downward into the tank. The upper end of each of the vents 51 and 52 projects through a perforated tray 53 which defines within the tank beneath the inlets 24 and 25 a space 54 communicated to the exterior of the tank through a conduit 55. The conduit 55, may, as is indicated in Fig. 1, return to the engine sump or it may simply discharge overboard of the aircraft. The lower end of the vent 51 passes through the baffle 42 near the higher end thereof and terminates immediately beneath that baffle. The vent 52, which is located at the opposite end of the tank, extends through baffle 42 and baffle 44, terminating immediately beneath baffle 44 at the higher end thereof. The low velocity flow of the oil along the baffles 42 and 44, and the shallowness of the flowing stream, permits a separation of the air from the oil in the form of air bubbles or as foam. Bubbles and foam released from the oil during its flow along baffle 42 may rise in the tank and pass through the perforations in tray 53 into the vented space 54. As the oil makes an abrupt turn at the end of each baffle, foam tends to collect beneath the raised ends of the baffles and is permitted to escape therefrom by way of the vents 51 and 52. After rising to the top of the vents 51 and 52 the foam lies in a quiescent condition within the space 54 whereupon the bubbles may coalesce and break, the liquid oil dropping down through the perforations in tray 53 to the main body of oil. The air released from the breaking bubbles passes from the tank by way of conduit 55. Effective deaeration of the oil therefore is accomplished by a combination of means producing a circuitous flow path through the tank, an absence of turbulence and shallowness of the flowing oil stream. The size and shape of the oil tank determines the number, position and size of the baffles and foam vents required for best deaeration.

While the baffles 42, 44 and 46 are shown as made of flat sheet metal stock, they may be corrugated to induce a more rapid release of entrained air. Also, some or all of the baffles may be constructed of wire mesh screen and so function as filters to remove foreign particles from the oil. The large combined surface area of the baffles makes possible a highly effective filter and obviates the need for conventional filter accessories which create a high pressure drop and are limited in surface in proportion to their size.

Alternative use is made of the tank inlets 24 and 25 in order that the oil returning from the engine may be directed at one time through the short path represented by the hopper 27, at another time through the long path represented by the baffled passageway in the main tank, and at still another time through both paths. There is mounted on the tank 16 a flange or fitting 56 having openings 57 and 58 therein respectively overlying the tank inlets 24 and 25. Opening 58 may receive with a press fit the upper end of conduit 31. Mounted on the fitting 56 is a sequence valve assembly, including a housing 59 formed with internal walls defining a central inlet chamber 61 and oppositely disposed outlet chambers 62 and 63. As shown in Fig. 3, the central chamber 61 constitutes the discharge end of conduit 22 by which oil returning from the engine is conveyed to the tank. Chamber 62 overlies opening 57 in fitting 56 and so communicates through inlet 24 with conduit 38 and the long path through the tank. Chamber 63 overlies opening 58 in fitting 56 and so communicates with conduit 31 and the short path through the tank. Chamber 61 is connected to chamber 62 by a port 64 and is connected to chamber 63 by a port 65. Within the housing 59 is a valve assembly comprising opposed valves 66 and 67, respectively controlling ports 64 and 65. The valve assembly includes a body 68 containing an amorphous material 79 having the property of expansion under the addition of heat. According to the construction and arrangement of the valve parts, expansion of the material 79 is effective to move the valve 66 away from port 64 and to move the valve 67 toward port 65. When the thermal substance 79 cools it is recompressed, and the body 68 returned to its starting position, by a spring 81.

The valve body 68 and valves 66 and 67 are arranged within inlet chamber 61, so that oil entering the chamber 61 may flow around the valve assembly and by a process of heat conduction induce in the thermal substance 79 an action appropriate to the temperature of the oil. In order that the oil may not heat the substance 79 too quickly a hood or shroud 85 is mounted on the body 68 in spaced relation to that part. In accordance with the varying temperature of the oil, therefore, the valve assembly is caused to move in such manner as to direct the oil entering chamber 61 either to chamber 62 or to chamber 63. Also it will be noted that the valve assembly may assume an intermediate position in which the flow is split, flowing in part to chamber 62 and in part to chamber 63. The oil in chamber 62 is permitted to pass to the tank inlet 24 by way of a series of openings 86 in the projecting portion 78 of closure plate 77. In general, the operation of the valve assembly is such that when the oil returned from the engine is cold, or below a predetermined temperature value, the parts assume under the urging of spring 81 a position like that shown in Fig. 2. Thus valve 66 is held closed within a port 64 and flow is denied to tank inlet 24, while port 65 is open permitting the oil to pass therethrough and by way of conduit 31 to the hopper 27. A quantity of oil less than that available in the system thereby is circulated. As the circulating oil acquires a higher temperature value, such temperature change is reflected in expansion of the thermal substance 79 resulting in motion of the valve assembly to withdraw valve 66 from closed position and to move valve 67 toward port 65. During an intermediate range of temperature values the oil flow will be divided between the ports 64 and 65, both of which are open. As the oil temperature continues to increase, the motion of the valve 67 toward closed position will continue until port 65 is blocked, so preventing further flow through the tank by way of hopper 27. Substantially all the oil returned from the engine then must pass by way of port 64 to inlet 24 and the long path through the tank. It will be observed that the manner of closing port 65 by valve 67 is such that in the event of excessive pressure in the system, as may result from a blocking of the flow in the main body of the tank, valve 67 may move under pressure through and beyond port 65 to permit a by-passing flow of the oil to the tank by way of hopper 27.

According to the present invention the introduction of a diluent into the system is accomplished through the valve housing 59, and is accomplished in such manner that irrespective of the oil temperature the flow through the tank during dilution will be by way of the hopper 27. This is desirable in the interest of economy of time and of diluent. The diluent employed may, as is indicated in Fig. 1, be gasoline drawn from the fuel tank 13. A conduit 87 is connected at one end to the fuel line 12 on the pressure side of pump 14 and is connected at its other end to the tank valve housing 59. Interposed in the conduit 87 is an electrically actuated solenoid unit 88 operable in a well-known manner when energized to open a valve to permit flow through the line 87 and operable when de-energized to close the valve and deny flow through the conduit. The solenoid 88 is disposed in an electrical system comprising a battery 89 from which extends a positive lead 91 and a negative lead 92 establishing a circuit through the solenoid 88. A switch 93 is disposed in the line 92 and is movable to open and close the circuit in the electrical system whereby to energize and de-energize the solenoid 88.

The conduit 87 is received in a threaded opening in the closed end of valve housing 59. The opening registers with the sequence valve assembly, so that diluent entering the housing by way of conduit 87 is conducted to the space between body 68 and the shroud or hood 85. Escape from the hood 85 is provided by ports through which the diluent may flow to chamber 61 and thence by way of port 65 to conduit 31 and the hopper 27. The diluent being considerably lower in temperature than the engine oil, and further having a cooling effect by reason of its high rate of evaporation, the effect gained is a chilling of the thermal substance 79 to allow the valve assembly to move by the action of spring 81 to a position opening port 65. Accordingly, during dilution the oil flow through the tank is by way of hopper 27. As the oil flows, the diluent intermingles therewith and produces a diluted mixture of lesser density than oil alone and one which is less susceptible to congelation. The quantity of liquid flowing through the hopper 27 is increased by addition of the diluent but overflow into the main tank is prevented by the flared extension 29 of the hopper.

According to the operation of the system, in an aircraft which has been in flight for a considerable length of time the oil in the engine lubrication system is heated to the maximum value set by the oil temperature regulator, and is substantially free of diluent. At this time the port 65 is fully closed and the port 64 is fully opened. Therefore, substantially all the oil returned from the engine is directed to tank inlet 24 and from there passes to manifold 39 and along the assembly of baffles 42 and 44 where it is deaerated and to some extent cooled. The head pressure of the oil in the main tank is at this time sufficient to overcome the resistance of the weighted flapper valves 48 so that the oil may pass from the tank through ports 47 into the lower part of hopper 27 and out outlet 26 to conduit 15 by which it is returned to the engine. As the aircraft comes in to land, or immediately after landing, and assuming that the ambient temperature is such as to make dilution desirable, the dilution control switch 93 is closed to energize solenoid 88 and permit diluent flow through conduit 87. In response to the cooling effect so obtained the valve assembly moves to close off port 64 and open port 65. The oil flow accordingly is diverted from tank inlet 24 to tank inlet 25 and passes to the hopper 27, having mixed therewith diluent which is supplied continuously to the system as long as switch 93 remains closed. The engine is continued in operation, circulating oil through the engine and through the hopper 27 of the tank until the desired dilution percentage has been attained, this being determined empirically or by appropriate measuring devices. As the oil circulates during dilution its density gradually becomes less so that the oil flowing through the hopper 27 has a lower density than the substantially undiluted oil in the tank outside the hopper. However, no flow of undiluted oil from the main tank into the system is permitted since the weighted flapper valves 48 hold the ports 47 closed against all but a determined difference in head pressure between the main tank and the hopper. When the desired dilution percentage is reached the dilution control switch 93 is opened to interrupt the flow of diluent to the lubrication system, and the engine is stopped. There is now present within the engine and within all the lines of the lubrication system, including the propeller feathering supply line 34 and excepting the main tank, highly diluted oil which effectively resists congelation during the period in which the aircraft stands idle.

When the engine is next started, preparatory to flight, the lubricating oil in the engine and in the system including hopper 27 of the tank, although not congealed is cold. Further, in the case of the sequence valve assembly the thermal substance 79 has responded to low temperature by moving the valve 66 to closed position and the valve 67 to opened position. Therefore, when the engine is started the oil flowing to the tank finds port 64 closed and is compelled to pass through port 65 and follow the short path through the tank defined by hopper 27. Continued operation of the engine warms the oil, and one effect of such gradually increasing temperature is to heat the hopper 27 and effect by a process of heat conduction warming of the adjacent oil in the main tank. The hopper 27 may in this sense be described as a warm-up compartment. Another result of higher oil temperature is to effect through expansion of the thermal substance 79 in valve body 68 motion of the body to open port 64. When this occurs, some of the warm oil from the engine flows to the manifold 39 in the main tank and begins a washing out or expelling of the cold oil therein. In order to provide for immediate flow through the main tank there is provided in the baffles 42, 44 and 46 respective openings 99, 101 and 102 adjacent the hopper 27. These openings provide a short circuit through the warmest part of the tank which is that area adjacent hopper 27 and establish a quick flow conducive to a rapid conditioning of all the oil in the tank for free flow. As the oil temperature rises still higher, and approaches the limit set by the oil cooler 21, valve 67 closes port 65 whereupon all the oil is required to pass through the main tank.

What is claimed is:

1. An oil tank having an inlet, a hopper having a separate inlet and substantially centrally disposed in said tank, outlet means for said tank and hopper, the walls of said hopper serving as a heat transfer means whereby the oil in the main body of the tank may be warmed by the heat of the oil passing through the hopper, a series of baffles in the main body of the tank compelling the greater portion of the oil to follow a tortuous path therethrough, openings in said baffles accommodating said hopper, openings in said baffles alongside said hopper combining to form a by-pass for quick flow of a portion of the oil through the first warmed area of the main tank, and valve means controlling flow from said tank through said outlet means.

2. An oil reservoir having a main tank and a hopper within said main tank, common outlet means for the hopper and the portion of the interior of the tank external to the hopper extending from the bottom of the hopper, the oil supplied said outlet means from said portion of the interior of the tank being relatively dense, valve means controlling flow of the relatively dense oil from said portion of the interior of the tank to said outlet means, and fin-like members projecting radially from said hopper into the body of oil in the tank.

3. An oil reservoir according to claim 2, characterized in that said fin-like members are located above said outlet means and tend to establish flow paths in the body of relatively dense oil leading to said outlet means.

4. An oil reservoir having a main tank and a hopper within said main tank, common outlet means for the hopper and the portion of the interior of the tank external to the hopper extending from the bottom of the hopper, means for venting air from said main tank, the oil in said portion of the interior of the main tank being relatively dense, and valve means controlling flow from said portion of the interior of the main tank to said outlet means.

5. An oil reservoir having a main tank and a hopper within said main tank, common outlet means for the hopper and the portion of the tank external to the hopper extending from the bottom of the hopper, means for venting air from said main tank, the oil supplied said outlet means from said portion of the interior of the tank being relatively dense, a valve controlling flow from said portion of the interior of the main tank to said outlet means, said valve closing in a direction opposed to the direction of flow from said tank, and means for biasing said valve to closed position.

6. An oil reservoir having a main tank and a hopper within said main tank, the portion of the interior of said main tank external of said hopper containing a more dense oil than that in said hopper, common outlet means for the hopper and said portion of the tank external to the hopper extending from the bottom of the hopper, valve means controlling flow from said portion of the interior of the main tank to said outlet means, and fin-like members in laterally penetrating relation to the body of oil in said portion of the interior of the main tank and extending radially from said hopper, the oil in said portion of the interior of said main tank encountering said members as it descends toward said outlet means.

References Cited in the file of this patent

UNITED STATES PATENTS

| Number | Name | Date |
| --- | --- | --- |
| 1,315,632 | Lawrence | Sept. 9, 1919 |
| 1,452,253 | Nevitt | Apr. 17, 1923 |
| 1,710,178 | McMurray | Apr. 23, 1929 |
| 1,786,790 | Sutton | Dec. 30, 1930 |
| 2,211,171 | Self | Aug. 13, 1940 |
| 2,316,729 | Tryon | Apr. 13, 1943 |
| 2,319,962 | Walker | May 25, 1943 |
| 2,354,856 | Erwin | Aug. 1, 1944 |
| 2,420,115 | Walker et al. | May 6, 1947 |
| 2,589,733 | Rosenblad | Mar. 18, 1952 |

FOREIGN PATENTS

| Number | Country | Date |
| --- | --- | --- |
| 376,480 | Great Britain | July 14, 1932 |
| 587,012 | Great Britain | Apr. 10, 1947 |
| 880,915 | France | Jan. 11, 1943 |